(12) United States Patent
Liang et al.

(10) Patent No.: US 9,507,384 B2
(45) Date of Patent: Nov. 29, 2016

(54) FOLDING DEVICE

(71) Applicant: Wistron Corporation, New Taipei (TW)

(72) Inventors: Chen-Yi Liang, New Taipei (TW); Che-Wen Liu, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 14/880,289

(22) Filed: Oct. 12, 2015

(65) Prior Publication Data

US 2016/0179142 A1    Jun. 23, 2016

(30) Foreign Application Priority Data

Dec. 19, 2014  (TW) .................................. 103144559

(51) Int. Cl.
*G06F 1/16* (2006.01)
(52) U.S. Cl.
CPC ........... *G06F 1/1656* (2013.01); *G06F 1/1669* (2013.01); *G06F 1/1679* (2013.01)
(58) Field of Classification Search
None
See application file for complete search history.

(56) References Cited

U.S. PATENT DOCUMENTS

| 7,187,538 B2* | 3/2007 | Homer | G06F 1/1616 16/221 |
| 8,089,748 B2* | 1/2012 | Chiang | G06F 1/1616 361/679.01 |
| 8,267,368 B2* | 9/2012 | Torii | F16M 13/00 248/188.8 |
| 8,498,100 B1* | 7/2013 | Whitt, III | G06F 1/1618 361/679.17 |
| 8,514,042 B2* | 8/2013 | Lauder | G06F 1/1647 24/303 |

(Continued)

FOREIGN PATENT DOCUMENTS

TW    201124042 A1    7/2011

OTHER PUBLICATIONS

Office action mailed on Mar. 18, 2016 for the Taiwan application No. 103144559, filing date: Dec. 19, 2014, p. 1 line 14, p. 2~4 and p. 5 line 1~3.

*Primary Examiner* — Xanthia C Cunningham
(74) *Attorney, Agent, or Firm* — Winston Hsu; Scott Margo

(57) ABSTRACT

A folding device provides a top case having magnetic elements at a top magnetic section and a bottom case having a groove and magnetic elements around the groove at a bottom magnetic section. As the top magnetic section of the top case is disposed at the bottom magnetic section of the bottom case, the top case is configurable at one of a folded position and at least two opened positions with respect to the bottom case. When the top case is at the first opened position, a first stopper and a first magnetic element at the groove of the bottom magnetic section maintain the top case at the first opened position; when the top case is at the second opened position, a second stopper and a second magnetic element at the groove of the bottom magnetic section maintain the top case at the second opened position.

20 Claims, 22 Drawing Sheets

(56) References Cited

U.S. PATENT DOCUMENTS

| | | | | |
|---|---|---|---|---|
| 8,599,542 B1* | 12/2013 | Healey | G06F 1/1626 | 345/168 |
| 8,817,457 B1* | 8/2014 | Colby | G06F 1/1669 | 206/320 |
| 8,913,376 B2* | 12/2014 | Wu | G06F 1/1626 | 248/917 |
| 8,934,219 B2* | 1/2015 | Gartrell | G06F 1/1616 | 248/229.22 |
| 9,025,321 B2* | 5/2015 | Liang | G06F 1/1669 | 361/679.01 |
| 9,036,340 B1* | 5/2015 | Colby | G06F 1/1669 | 206/320 |
| 9,072,174 B2* | 6/2015 | Lin | H05K 7/02 | |
| 9,122,448 B2* | 9/2015 | Gao | G06F 1/1632 | |
| 9,218,024 B2* | 12/2015 | Gengler | G06F 1/1632 | |
| 9,304,549 B2* | 4/2016 | Siddiqui | E05D 7/00 | |
| 9,329,639 B2* | 5/2016 | Lee | G06F 1/1669 | |
| 9,372,511 B2* | 6/2016 | Yeh | G06F 1/1669 | |
| 2008/0297995 A1* | 12/2008 | Lai | G06F 1/1616 | 361/679.09 |
| 2010/0123663 A1* | 5/2010 | Leung | G06F 3/0231 | 345/169 |
| 2010/0238620 A1* | 9/2010 | Fish | G06F 1/1616 | 361/679.09 |
| 2011/0159934 A1 | 6/2011 | Yu | | |
| 2011/0292584 A1* | 12/2011 | Hung | G06F 1/1632 | 361/679.26 |
| 2012/0099267 A1* | 4/2012 | Ahn | F16M 11/10 | 361/679.27 |
| 2012/0113579 A1* | 5/2012 | Agata | G06F 1/1613 | 361/679.09 |
| 2012/0175487 A1* | 7/2012 | Goto | G10G 7/00 | 248/447 |
| 2012/0243149 A1* | 9/2012 | Gartrell | G06F 1/1616 | 361/679.01 |
| 2013/0063873 A1* | 3/2013 | Wodrich | G06F 1/1635 | 361/679.01 |
| 2013/0170126 A1* | 7/2013 | Lee | G06F 1/1654 | 361/679.17 |
| 2013/0279096 A1* | 10/2013 | Gengler | H05K 7/00 | 361/679.01 |
| 2014/0267050 A1 | 9/2014 | Spollen | | |
| 2014/0313665 A1* | 10/2014 | Delpier | G06F 1/1616 | 361/679.55 |

* cited by examiner

FOLDING DEVICE

BACKGROUND OF THE INVENTION

1. Field of the Invention

The invention relates to a folding device, and more particularly, to a folding device having top case and bottom case magnetically attracted to each other at various positions.

2. Description of the Prior Art

Most electronic devices prepared holes for disposition of rotation shaft between the top cover and the main body, so that the top cover may be connected to the main body via the rotation shaft, capable of opening or folding with respect to the body. For example, the LCD cover of a laptop computer utilizes the rotation shaft to connect to the main body for being opened or closed.

The disposition of rotation shaft, however, requires cutting open the main body to form or accommodate a rotation shaft. For example, the LCD cover of a laptop have to be cut open for assembling with a rotation sub-shaft and the main body also have to be cut open for assembling with a rotation shaft, which is then assembled with the rotation sub-shaft on the LCD cover, so that the LCD cover may be assembled with the main body. The rotation shafts serve for providing the LCD cover the ability to open or close with respect to the main body.

Tablet is also one kind of device that can be put together with a main body (in the form of a keyboard) and function as a laptop computer. Likewise, the main body should be cut open to accommodate the rotation shaft and the tablet also requires corresponding engagement or slot for assembling with the rotation shaft on the main body. These openings not just compromise the aesthetics of designing the laptop computer, but add overall thickness and cost for manufacturing such laptop computer.

Hence, it is an eagerly expected issue to provide foldability for electronic devices and still cut down the cost of manufacturing such, while beauty and practicability of the electronic devices are well maintained.

SUMMARY OF THE INVENTION

To solve the above mentioned problem, an embodiment of the invention provides a folding device including a bottom case and a top case. The bottom case has a bottom magnetic section, which includes a groove, a lower magnetic element, a first magnetic element, a first stopper, and a second stopper. The groove includes a first abutting portion, a bottom surface, and a supporting surface. The bottom surface is located between the first abutting portion and the supporting surface. The lower magnetic element is disposed near the first abutting portion. The first magnetic element is disposed near the bottom surface. The first stopper is disposed between the bottom surface and the supporting surface. The second stopper is disposed at an end of the supporting surface. The top case has a top magnetic section, which includes an upper magnetic element disposed at a bottom end of the top case. The top case is selectively configurable at a folded position, a first opened position, or a second opened position with respect to the bottom case. When the top case is at the folded position, the upper magnetic element and the lower magnetic element are in attraction with each other. When the top case is at the first opened position, a second abutting portion of the top case abuts against an end portion of the first abutting portion, the upper magnetic element and the first magnetic element are in attraction with each other, and the bottom end is positioned by the first stopper. When the top case is at the second opened position, the second abutting portion abuts against the end portion of the first abutting portion, and the bottom end is positioned by the second stopper, wherein the top case moves from the first opened position to the second opened position via the second abutting portion moving relative to the bottom case.

In the embodiment of the invention, the bottom magnetic section further includes a second magnetic element disposed near the supporting surface, and the upper magnetic element and the second magnetic element are in attraction with each other when the top case is at the second opened position.

In the embodiment of the invention, each of the lower magnetic element, the first magnetic element, the second magnetic element, and the upper magnetic element includes at least two magnets aligning adjacent to one another with opposite polarity.

In the embodiment of the invention, the top magnetic section further includes a third magnetic element disposed near the second abutting portion and the third magnetic element and the lower magnetic element are in attraction with each other when the top case is at the first opened position, the second opened position, or moving between the first opened position and the second opened position. The top case includes a chamber near the second abutting portion. The third magnetic element is disposed and moveable within the chamber and includes at least two magnets aligning adjacent to one another with opposite polarity.

In the embodiment of the invention, an arm of force is defined along the connection of an abutting point where the second abutting portion abuts against the first abutting portion and an attraction center between the upper magnetic element and the first magnetic element, the first stopper includes an inclined surface, and the included angle between the inclined surface and the arm or force is between 40 to 75 degrees.

In the embodiment of the invention, the first stopper is a wall connecting the bottom surface and the supporting surface.

In the embodiment of the invention, the first stopper is a bump disposed between the bottom surface and the supporting surface.

In the embodiment of the invention, the first stopper is an elastic arm having the inclined surface and protruding between the bottom surface and the supporting surface.

In the embodiment of the invention, the first stopper includes a rotating piece pivotally disposed near the bottom surface and the inclined surface protrudes from between the bottom surface and the supporting surface.

In the embodiment of the invention, the rotating piece includes an arm near the bottom surface and the first stopper further includes an elastic piece connecting between the groove and the arm.

In the embodiment of the invention, the rotating piece includes an arm near the bottom surface and the first magnetic element is disposed at the arm and is adaptive to rotate the rotating piece to protrude the inclined surface from between the bottom surface and the supporting surface when the top case is at the first opened position where the upper magnetic element and the first magnetic element are in attraction with each other.

In the embodiment of the invention, the bottom magnetic section further includes a second magnetic element disposed near the supporting surface and the rotating piece includes an arm and an arm magnetic element near the supporting surface. The arm magnetic element is disposed at the arm and is adaptive to rotate the rotating piece to protrude the inclined surface from between the bottom surface and the supporting surface when the top case is at the first opened position where the second magnetic element and correspondingly repels the arm magnetic element.

In the embodiment of the invention, when the top case is at the first opened position, the top case and the bottom case have included angle of 110 degrees, and when the top case is at the second opened position, the top case and the bottom case have included angle of 135 degrees.

In the embodiment of the invention, the top case is a tablet device and the bottom case is a keyboard.

The folding device provided in the invention needs no further pivoting mechanism between two cases, but fixing one case at the folded position and at least two different opened positions by magnetic attachment instead, saving the configuration of rotation shaft at the case while magnetic attachment provides fast alteration to a different position.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
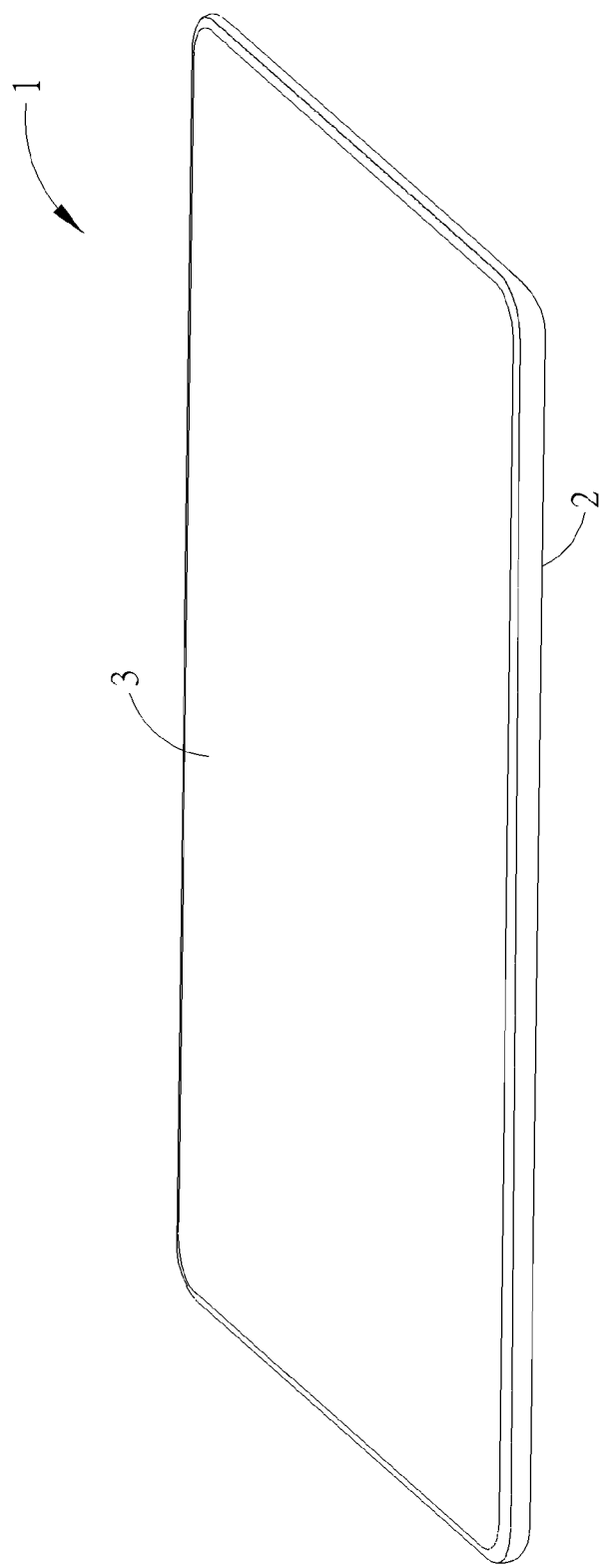
FIG. 1 is a schematic diagram showing a perspective view of an embodiment of the folding device according to the invention with the top case rotated adjacent to the bottom case.
Figure 2:
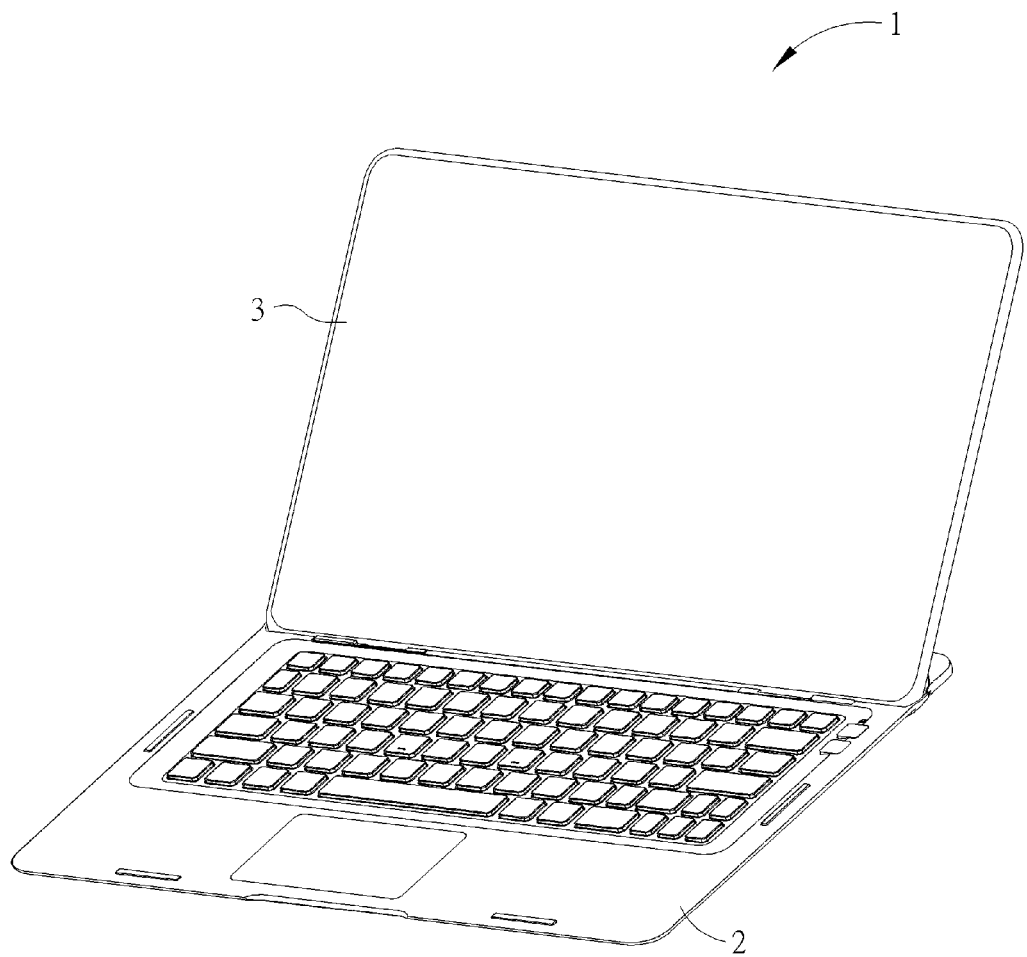
FIG. 2 is a schematic diagram showing a perspective view of the folding device in FIG. 1 with the top case opened to a first opened position.

Please refer to FIG. 1 and FIG. 2. FIG. 1 is a schematic diagram showing a perspective view of an embodiment of the folding device according to the invention with the top case rotated adjacent to the bottom case and FIG. 2 is a schematic diagram showing a perspective view of the folding device in FIG. 1 with the top case opened to a first opened position. The folding device 1 includes bottom case 2 and a top case 3. The bottom case 2 is roughly a plain structure, which is preferably a keyboard in the invention, and the top case is also roughly a plain structure, which is preferably a tablet device in the invention. More specifically, the top case 3 alone can be a tablet device or the like and can be put together with the bottom case 2 to be a laptop computer or the like. In FIG. 1, the top case 3 is assembled and rotated adjacent to the bottom case 2 at a relative folded position. In FIG. 2, the top case 3 is opened with respect to the bottom case 2 to a first opened position as a laptop computer. In the invention, the top case 3 may further be opened to a second opened position with respect to the bottom case 2, details of which is described in the following paragraphs.

Figure 3:
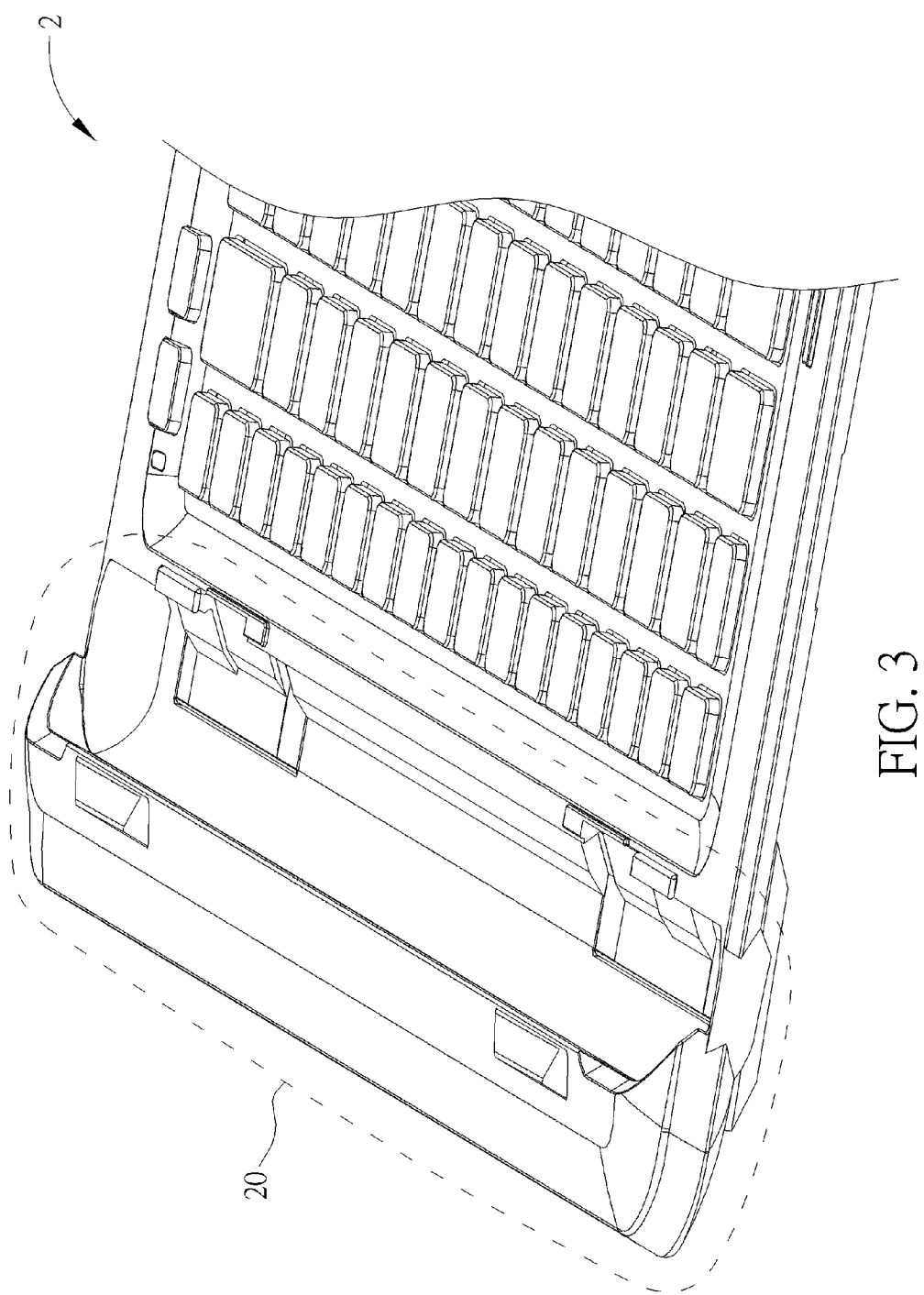
FIG. 3 is a schematic diagram showing a partial perspective view of a first embodiment of the bottom case of the folding device in FIG. 1.
Figure 4:
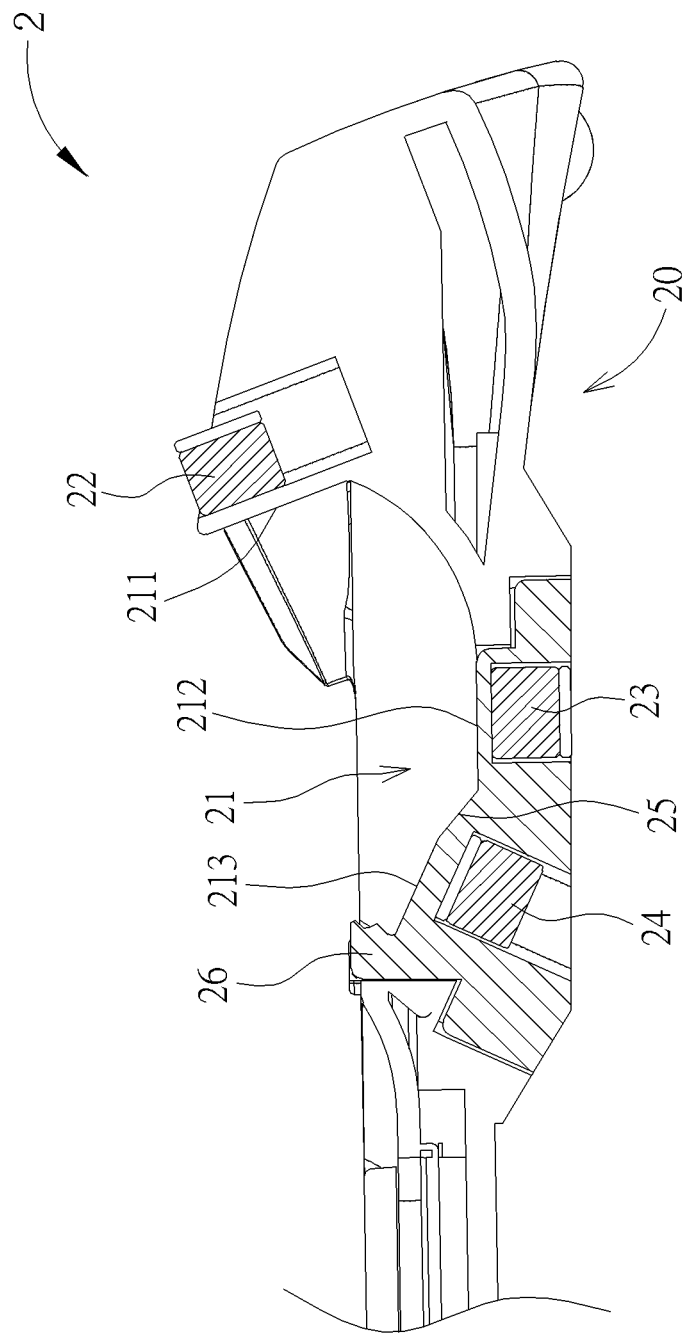
FIG. 4 is a schematic diagram showing a partial side cross sectional view of a first embodiment of the bottom case in FIG. 3.

Please refer to FIG. 3 and FIG. 4. FIG. 3 is a schematic diagram showing a partial perspective view of a first embodiment of the bottom case of the folding device in FIG. 1 and FIG. 4 is a schematic diagram showing a partial side cross sectional view of a first embodiment of the bottom case in FIG. 3. The bottom case 2 includes a bottom magnetic section 20 located at a side of the bottom case 2. The bottom magnetic section 20 includes a groove 22, a first magnetic element 23, a second magnetic element 24, a first stopper 25, and a second stopper 26. The groove 21 has a first abutting portion 211, a bottom surface 212, and a supporting surface 213, in which the bottom surface 212 is located between the first abutting portion 211 and the supporting surface 213. The lower magnetic element 22 is disposed near the first abutting portion 211, the first magnetic element 23 is disposed near the bottom surface 212, and the second magnetic element is disposed near the supporting surface 213. Additionally, the first stopper 25 is disposed between the bottom surface 212 and the supporting surface 213, whereas in this embodiment, the first stopper 25 is a wall, an inclined surface, connected between the bottom surface 212 and the supporting surface 213. The second stopper 26 is disposed at an end of the supporting surface 213.

Figure 5:
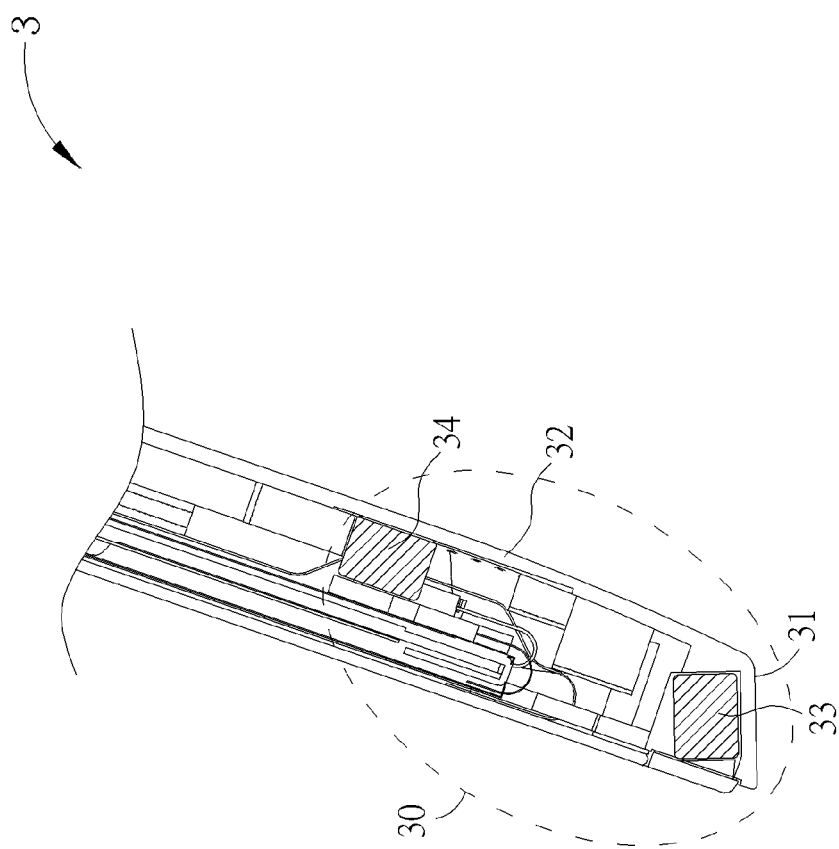
FIG. 5 is a schematic diagram showing a partial side cross sectional view of a first embodiment of the top case.

Please refer to FIG. 5. FIG. 5 is a schematic diagram showing a partial side cross sectional view of a first embodiment of the top case. The top case 3 has a top magnetic section 30 located at a side of the top case 3. The top magnetic section 30 includes an upper magnetic element 33 disposed near a bottom end 31 of the top case 3, and more specifically, within a second abutting portion 32 near the bottom end 31.

Figure 6:
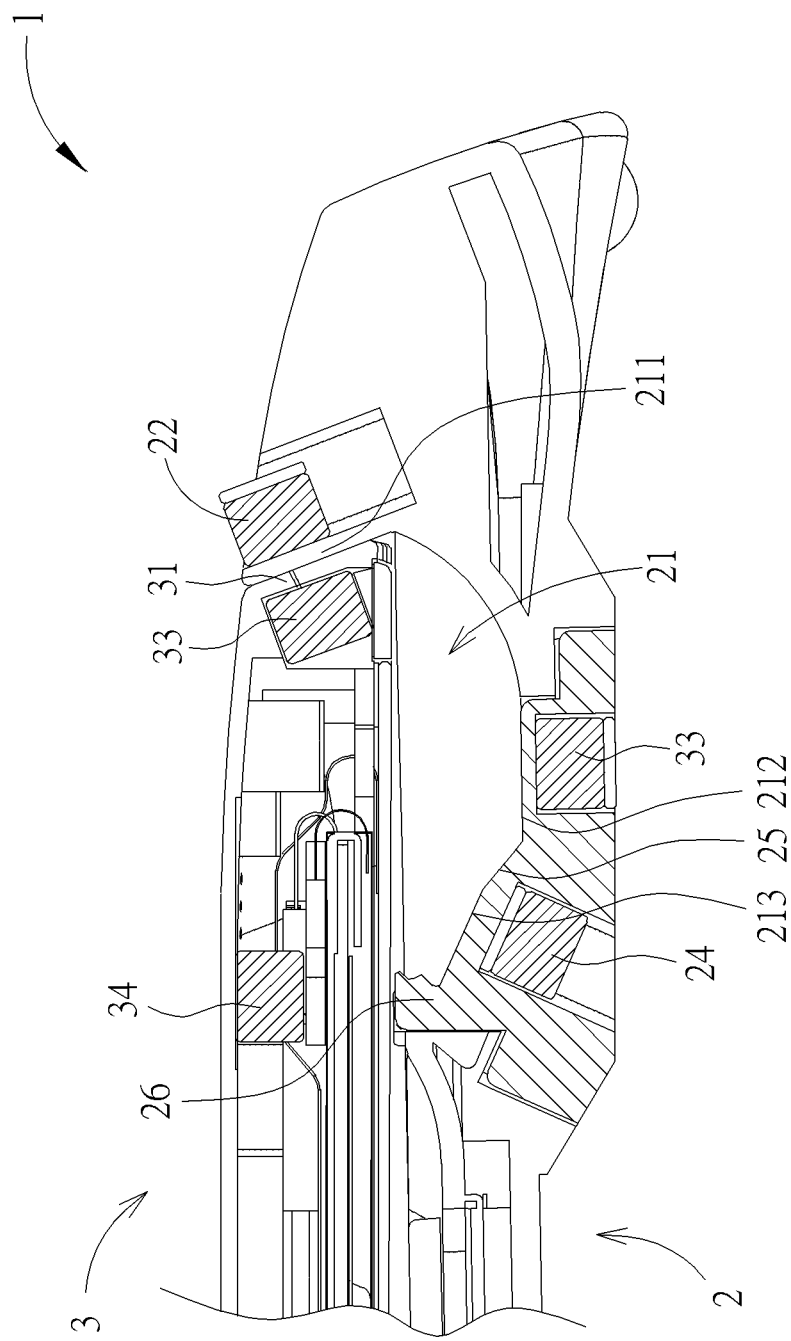
FIG. 6 is a schematic diagram showing a partial side cross sectional view of the first embodiment of the top case of the folding device of the invention disposed at the folded position with respect to the first embodiment of the bottom case in FIG. 4.
Figure 7:
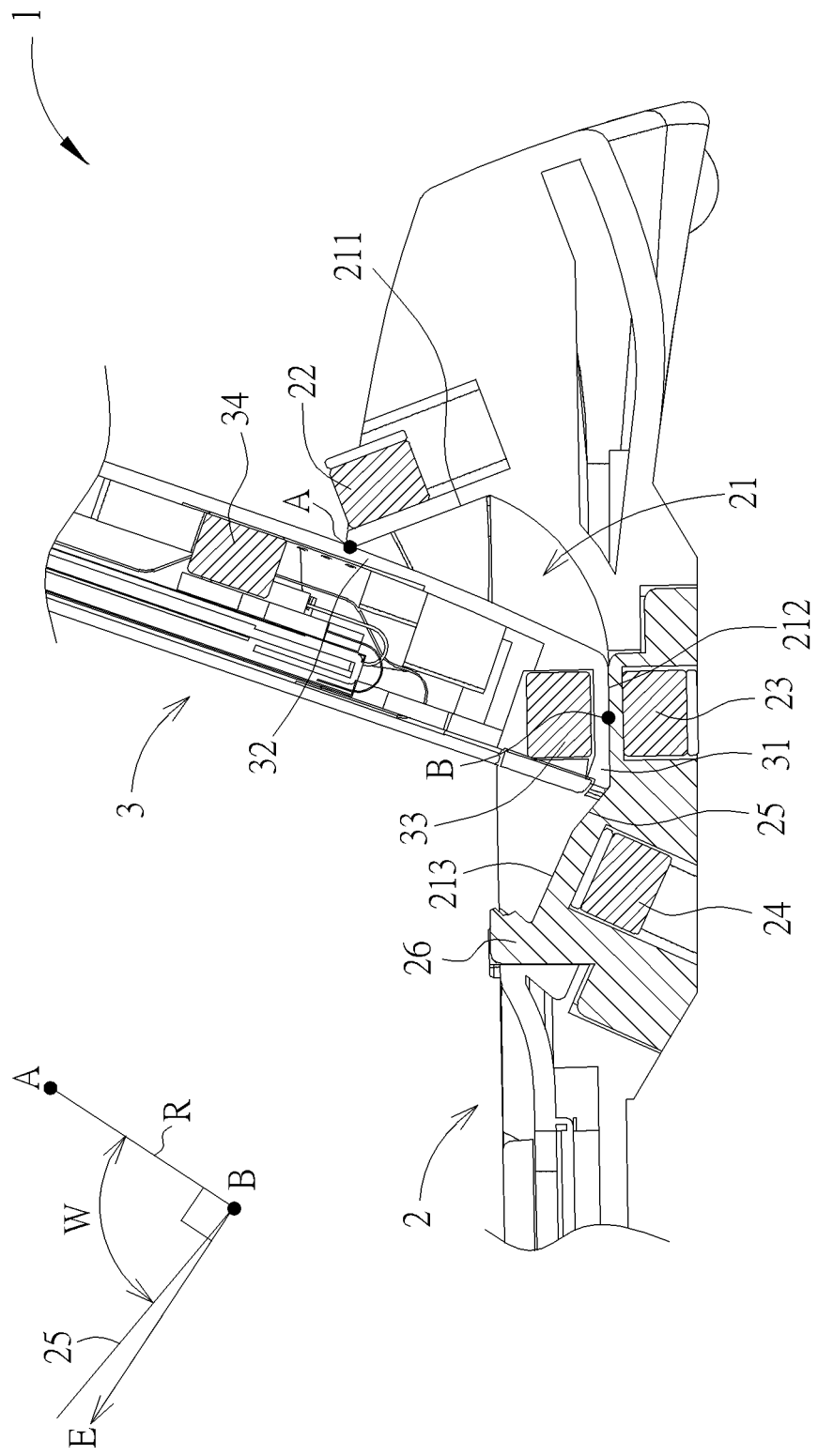
FIG. 7 is a schematic diagram showing a partial side cross sectional view of the first embodiment of the top case disposed at the first opened position with respect to the first embodiment of the bottom case.
Figure 8:
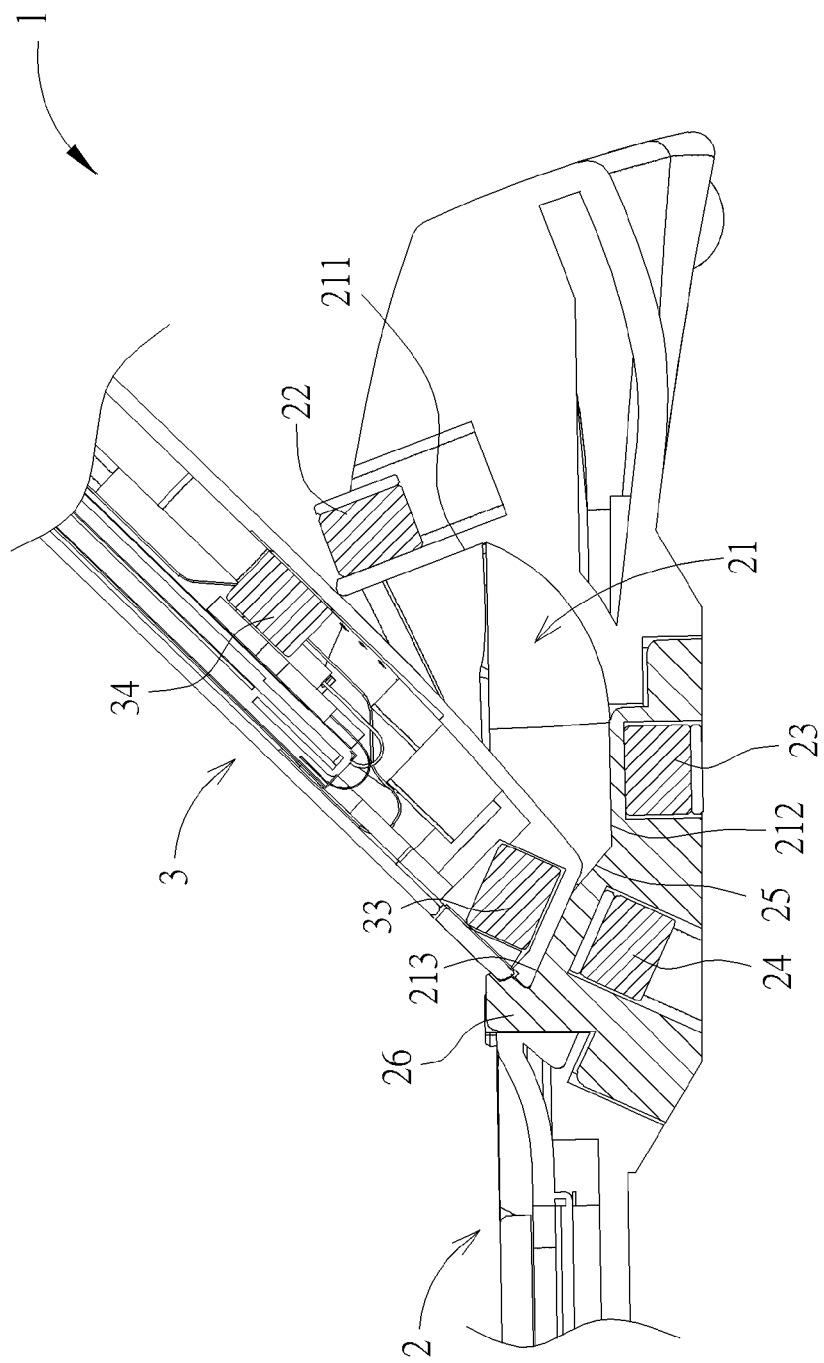
FIG. 8 is a schematic diagram showing a partial side cross sectional view of the first embodiment of the top case disposed at the second opened position with respect to the first embodiment of the bottom case.

The top case 3 may be selectively configured at a folded position, a first opened position, or a second opened position with respect to the bottom case . Ina preferred embodiment of the invention, but not limited to, the top case 3 and the bottom case 2 have included angle of 110 degrees when the top case 3 is at the first opened position and the top case 3 and the bottom case 2 have included angle of 135 degrees when the top case 3 is at the second opened position. Please refer to FIG. 6 to FIG. 8. FIG. 6 is a schematic diagram showing a partial side cross sectional view of the first embodiment of the top case of the folding device of the invention disposed at the folded position with respect to the first embodiment of the bottom case in FIG. 4, FIG. 7 is a schematic diagram showing a partial side cross sectional view of the first embodiment of the top case disposed at the first opened position with respect to the first embodiment of the bottom case, and FIG. 8 is a schematic diagram showing a partial side cross sectional view of the first embodiment of the top case disposed at the second opened position with respect to the first embodiment of the bottom case. In FIG. 6, when the top case 3 is at the folded position, the top case 3 is rotated adjacent to the bottom case 2 with the upper magnetic element 33 within the bottom end 31 and the lower magnetic element 22 within the first abutting portion 211 in attraction with each other.

As the top case 3 opens from the folded position as in FIG. 6 to the first opened position as in FIG. 7, the top magnetic section 30 of the top case 3 is rotating in the groove 21 of the bottom magnetic section 20 of the bottom case 2, until the bottom end 31 of the top case 3 is located at the bottom surface 212 of the groove 21, at which position the upper magnetic element 33 and the first magnetic element 23 under the bottom surface 212 are in attraction with each other and the second abutting portion 32 of the top case 3 near the bottom end 31 abuts against an end portion of the first abutting portion 211 of the groove 21. Also at the first opened position, the bottom end 31 of the top case 3 is positioned by the first stopper 25 such that the segment between the second abutting portion 32 to the bottom end 31 may not fall out of the groove 21 when the top case 3 has its second abutting portion 32 abutting the end portion of the first abutting portion 211.

To further open the top case 3 from the first opened position as shown in FIG. 7 to the second opened position as shown in FIG. 8, slight force may be exerted clockwise toward the top case 3, so that the bottom end 31 of the top case 3 may escape from the withstanding of the first stopper 25 and the top case 3 rotates from the first opened position to the second opened position taking the second abutting portion 32 as the rotating center with respect to the bottom case 2. When the top case 3 is at the second opened position as shown in FIG. 8, the second abutting portion 32 is still abutting against the end portion of the first abutting portion 211, whereas the upper magnetic element 33 and the second magnetic element 24 from within the supporting surface 213 are in attraction with each other and the bottom end 31 is positioned by the second stopper 26, such that the segment between the second abutting portion 32 to the bottom end 31 may not fall out of the groove 21. It should be noted that in the embodiment of the invention, the second magnetic element 24 is also omissible under the condition that the second stopper 26 is capable of providing full support for the bottom end 31 and maintain the top case 3 at the second opened position.

In FIG. 6 to FIG. 8, the top case 3 further includes a third magnetic element 34 disposed near the second abutting portion 32. As the top case 3 is at the first opened position as shown in FIG. 7, the second opened position as shown in FIG. 8, or moving between the first opened position and the second opened position, the third magnetic element 34 and the lower magnetic element 22 within the first abutting portion 211 are in attraction with each other. As the top case 3 moves from the second opened position in FIG. 8 back to the first opened position in FIG. 7, the attraction force between the third magnetic element 34 and the lower magnetic element 22 keeps providing component toward the first abutting portion 211, which effectively retains the second abutting portion 32 at the first abutting portion 211, and the abutting point where the second abutting portion 32 abutting against the first abutting portion 211 is the center of rotation of the top case 3 moving between the first opened position and the second opened position.

Figure 9:
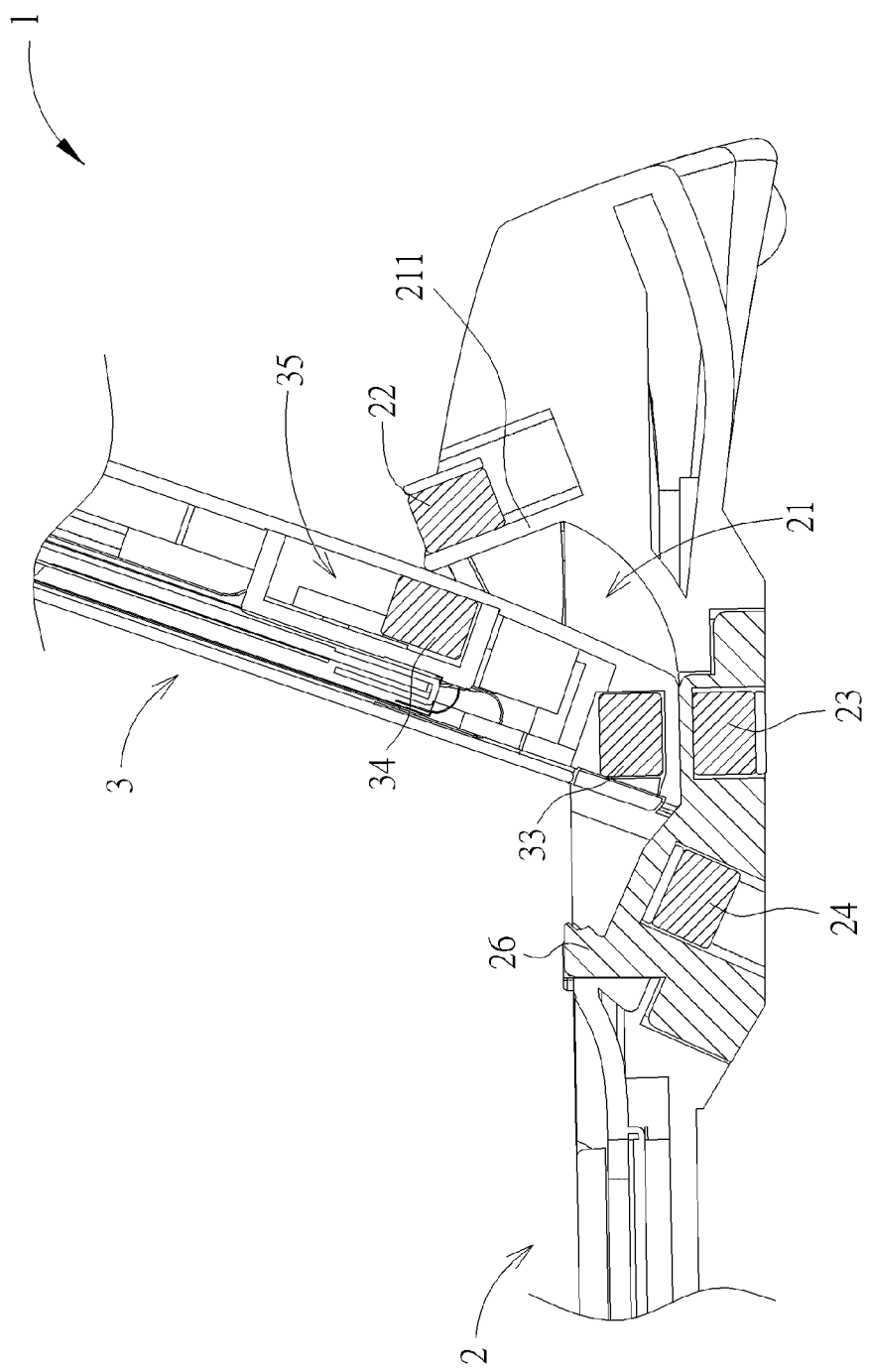
FIG. 9 is a schematic diagram showing a partial side cross sectional view of a second embodiment of the top case disposed at the first opened position with respect to the first embodiment of the bottom case.
Figure 10:
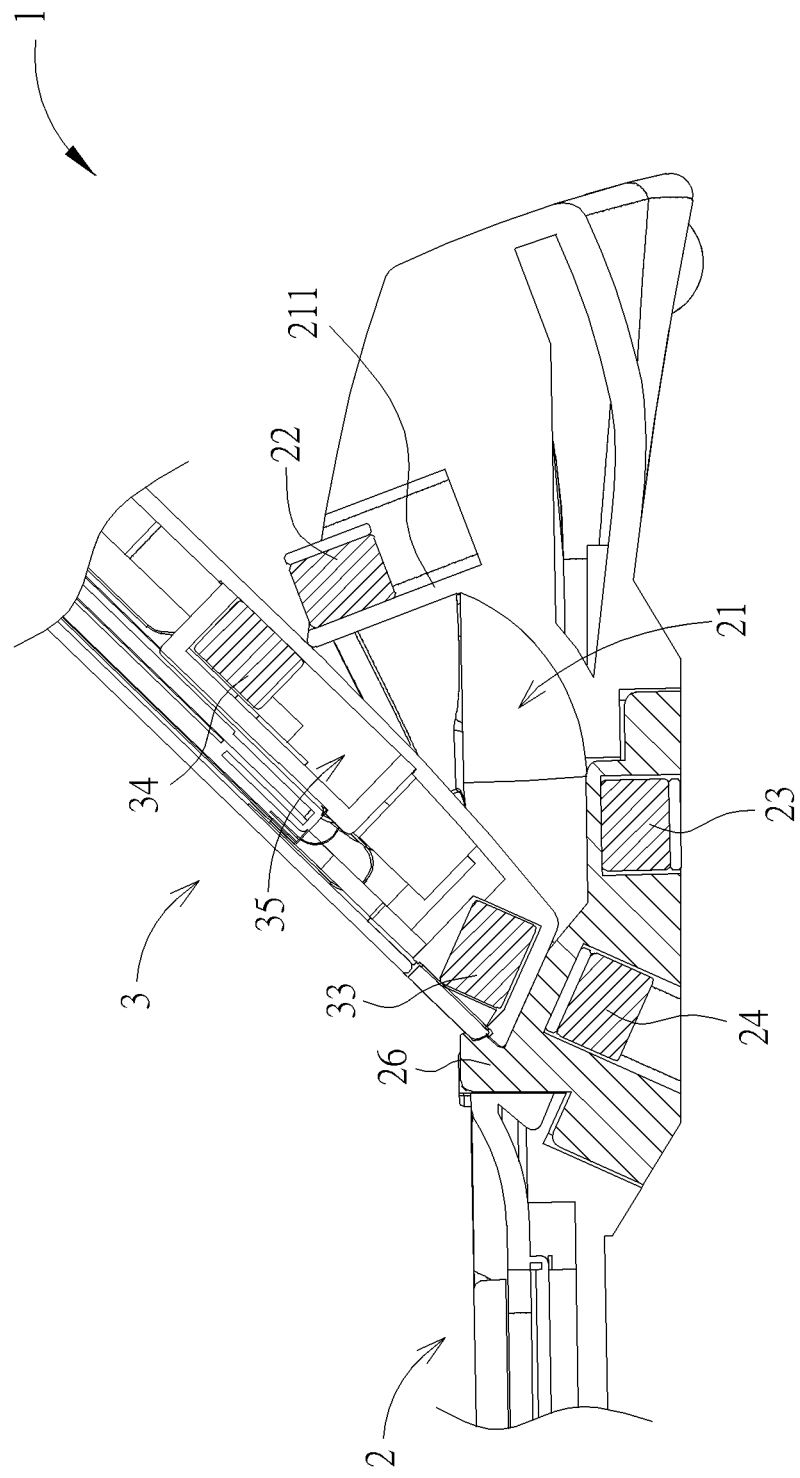
FIG. 10 is a schematic diagram showing a partial side cross sectional view of the second embodiment of the top case disposed at the second opened position with respect to the first embodiment of the bottom case.

Please refer to FIG. 9 and FIG. 10. FIG. 9 is a schematic diagram showing a partial side cross sectional view of a second embodiment of the top case disposed at the first opened position with respect to the first embodiment of the bottom case and FIG. 10 is a schematic diagram showing a partial side cross sectional view of the second embodiment of the top case disposed at the second opened position with respect to the first embodiment of the bottom case. For the embodiment in FIG. 9 and FIG. 10, the top case 3 has a chamber 35 inside that is near the second abutting portion 32, whereas the third magnetic element 34 is disposed and moveable within the chamber 35. Hence, as the top case 3 rotates between the first opened position shown in FIG. 9 and the second opened position shown in FIG. 10 with respect to the bottom case 2, the third magnetic element 34 can be moved in the chamber 35 due to the mutual attraction with the lower magnetic element 22 so as to always keep a minimum distance to the lower magnetic element 22 and a greater attraction between the third magnetic element 34 and the lower magnetic element 22 will be provided.

Figure 11:
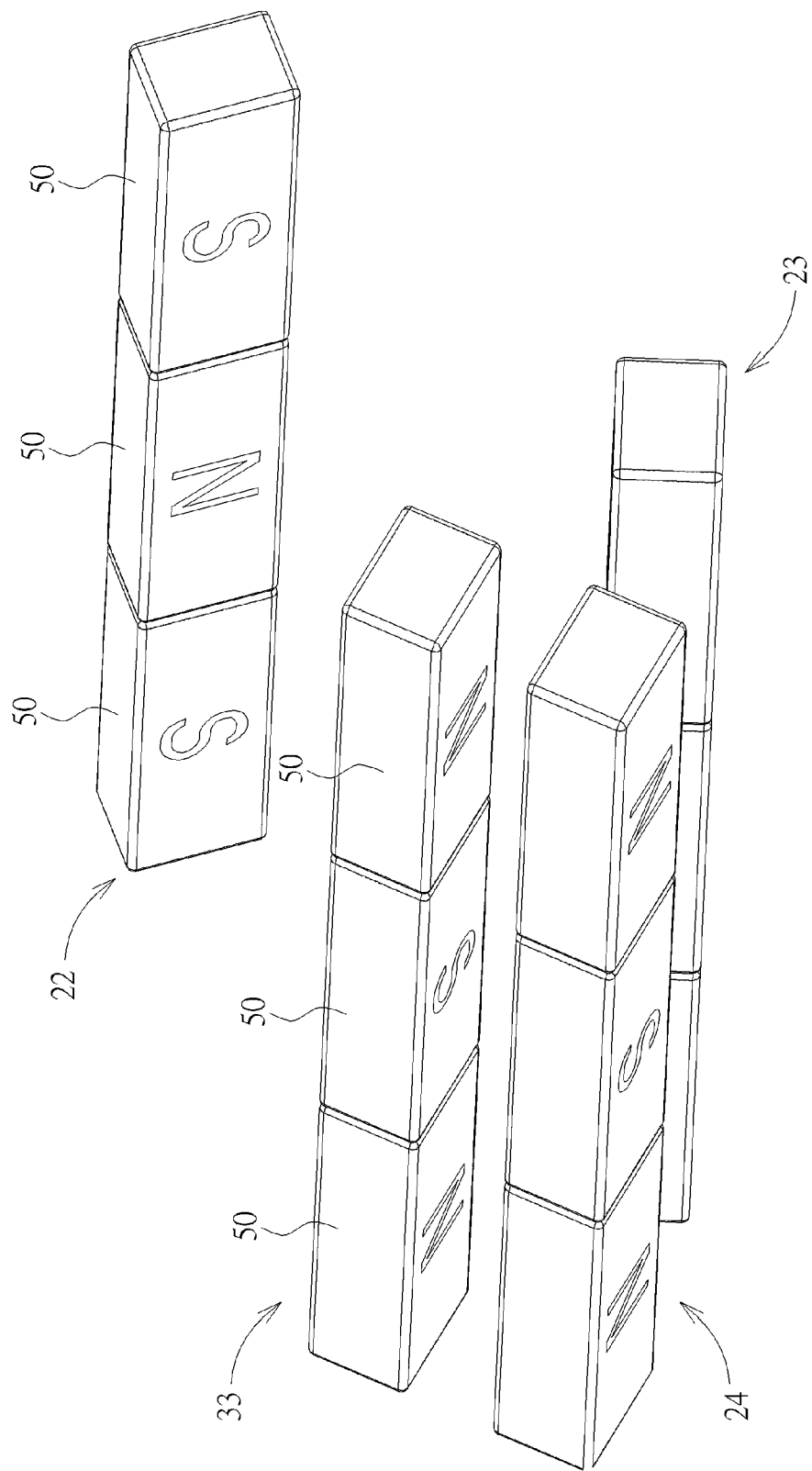
FIG. 11 is a schematic diagram showing some magnetic elements of the folding device according to the invention.
Figure 12:
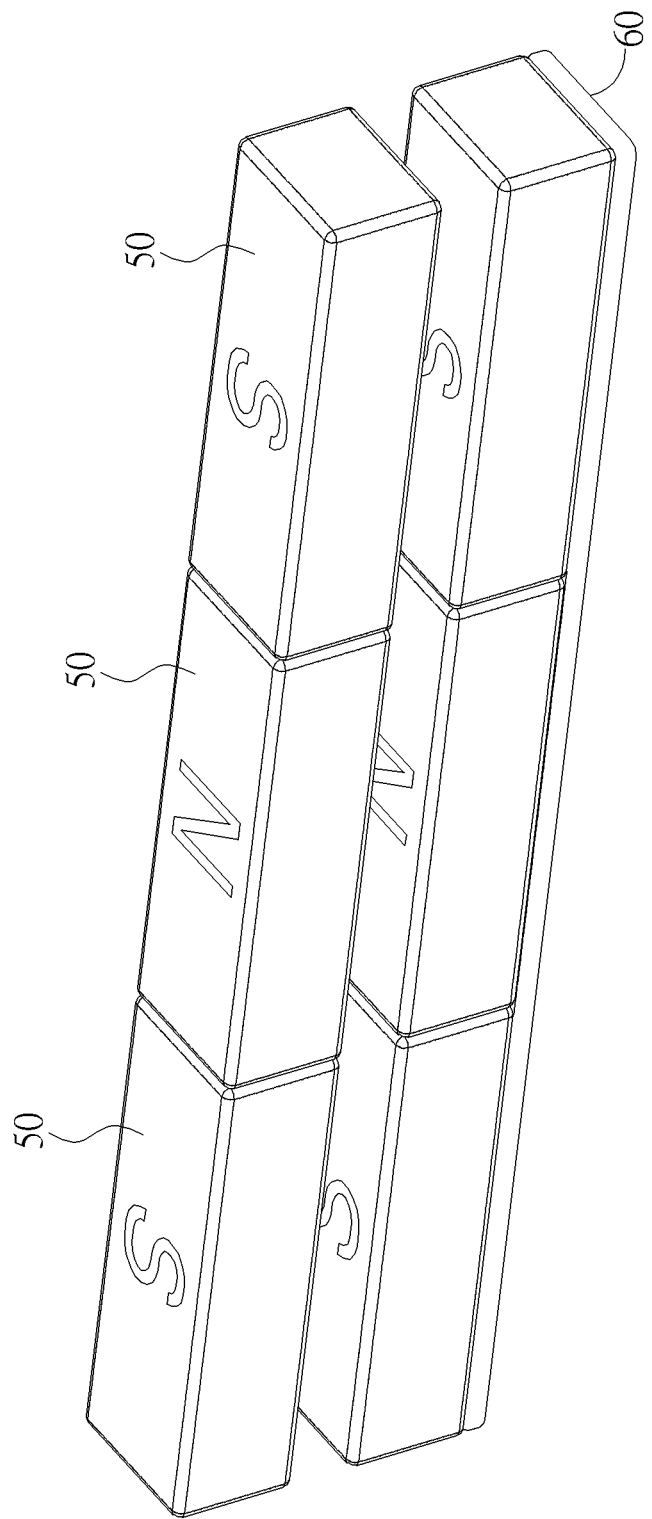
FIG. 12 is a schematic diagram of the magnetic elements with metal pieces.

Please refer to FIG. 11 and FIG. 12 . FIG. 11 is a schematic diagram showing some magnetic elements of the folding device according to the invention and FIG. 12 is a schematic diagram of the magnetic elements with metal pieces. In a preferred embodiment, each magnetic element such as the lower magnetic element 22, the first magnetic element 23, the second magnetic element 24, the upper magnetic element 33 shown in FIG. 11, or the third magnetic element not shown in the figure, can include at least two magnets 50, three magnets 50 in the embodiment shown in FIG. 11 and FIG. 12, aligning adjacent to one another with opposite polarity. The alignment of the magnets can prevent lateral movement between the top case 3 and the bottom case 2 and increase the operational stability when the top case 3 changes among various positions with respect to the bottom case 2. A ferromagnetic metal piece can further be added outside the magnets 50 as shown in FIG. 12 or between the magnetic elements, which is not shown, so as to enhance the magnetic attraction between the upper magnetic element 33 (or the third magnetic element 34) of the top case 3 and the magnetic elements of the bottom case 2.

Figure 13:
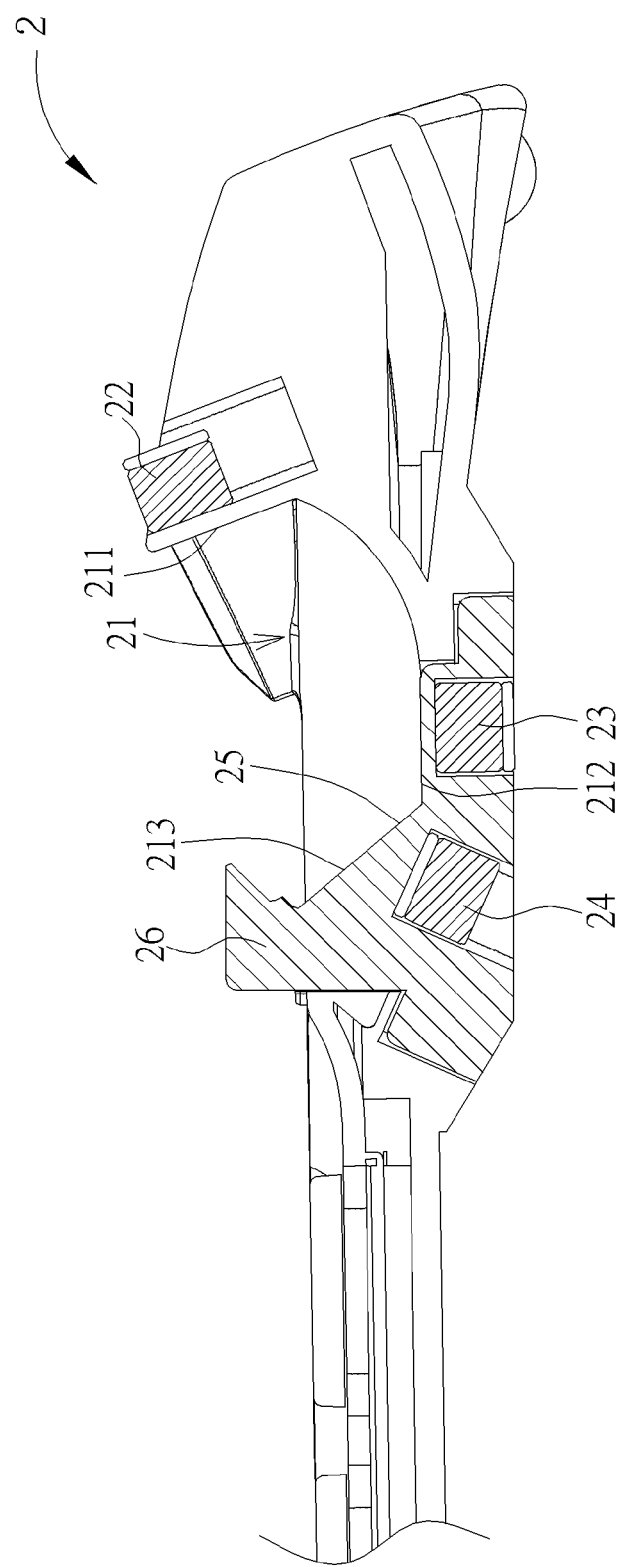
FIG. 13 is a schematic diagram showing a partial side cross sectional view of a second embodiment of the bottom case of the folding device according to the invention.

Please refer to FIG. 13, which is a schematic diagram showing a partial side cross sectional view of a second embodiment of the bottom case of the folding device according to the invention. For the embodiment in FIG. 13, the first stopper 25 is a wall connecting the bottom surface 212 and the supporting surface 213, in which the supporting surface 213 and the first stopper 25 are continuous same-oriented inclined surfaces.

It should be noted that, taking example of the embodiment in FIG. 7 and other figures, to effectively maintain the top case 3 at the first opened position as shown in FIG. 7 and described above, such that the bottom end 31 of the top case 3 may be positioned by the first stopper 25 and the segment between the second abutting portion 32 to the bottom end 31 may not fall out of the groove 21, firstly at the first opened position, an arm of force R is defined along the connection of an abutting point A where the second abutting portion 32 abuts against the first abutting portion 211 and an attraction center B between the upper magnetic element 33 and the first magnetic element 23. The abutting point A as the rotation center of the top case 3, an escaping direction E of the bottom end 31 is perpendicular to the arm of force R, and the inclined surface of the first stopper 25 is designed to have an included angle W with the arm of force R to be smaller than 90 degrees. In such way, the first stopper 25 is made to effectively withstand the bottom end 31 of the top case 3 and maintain the top case 3 at the first opened position. In each embodiment of the invention, the included angle W between the inclined surface of the first stopper 25 and the arm of force R may be between 40-75 degrees or larger than 75 degrees, and preferably between 50-70 degrees.

Figure 14:
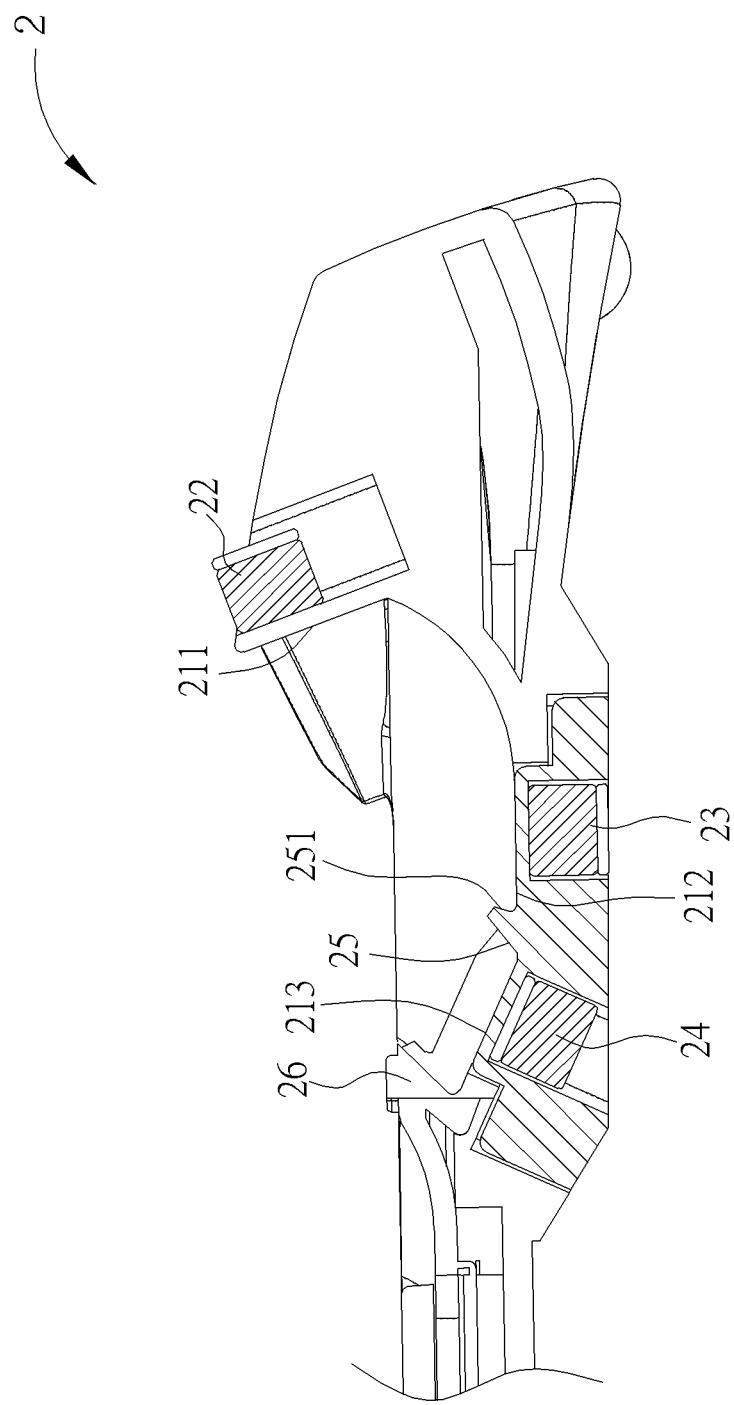
FIG. 14 is a schematic diagram showing a partial side cross sectional view of a third embodiment of the bottom case of the folding device according to the invention.

Please refer to FIG. 14. FIG. 14 is a schematic diagram showing a partial side cross sectional view of a third embodiment of the bottom case of the folding device according to the invention. In the third embodiment, the first stopper 25 of the bottom case 3 is a bump disposed between the bottom surface 212 and the supporting surface 213 and has an inclined surface 251 serving as the embodiment in FIG. 3 and description of the inclined surface 251 is omitted here for brevity.

Figure 15:
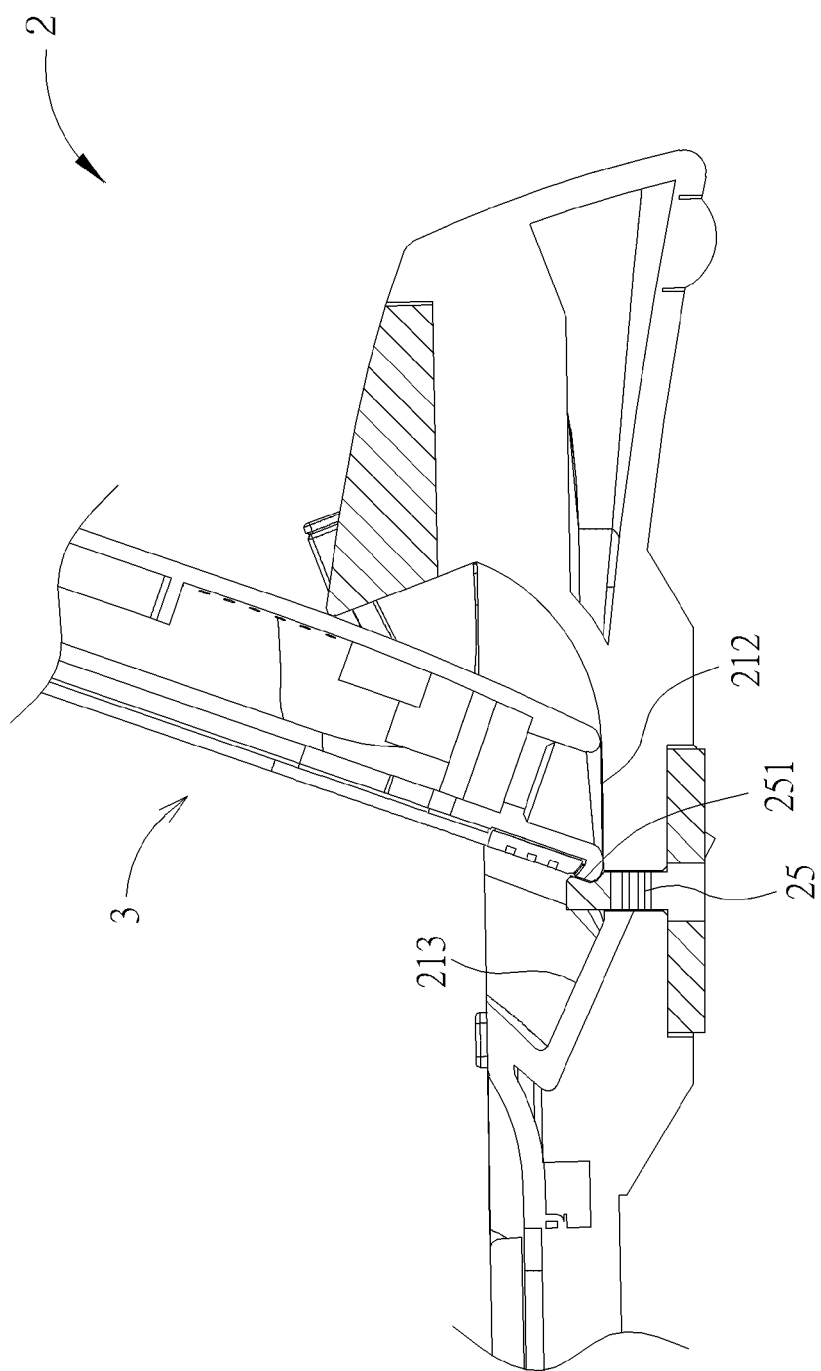
FIG. 15 is a schematic diagram showing a partial side cross sectional view of the top case disposed at the first opened position with respect to a fourth embodiment of the bottom case.
Figure 16:
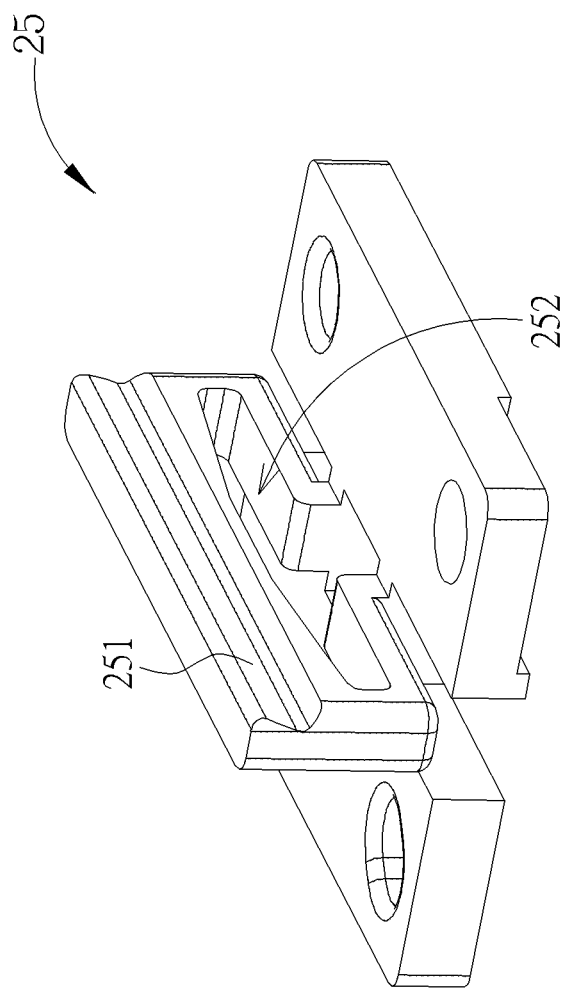
FIG. 16 is a schematic diagram showing an elastic arm of the bottom case in FIG. 15.

Please refer to FIG. 15 and FIG. 16. FIG. 15 is a schematic diagram showing a partial side cross sectional view of the top case disposed at the first opened position with respect to a fourth embodiment of the bottom case and FIG. 16 is a schematic diagram showing an elastic arm of the bottom case in FIG. 15. For the fourth embodiment, the first stopper 25 is an elastic arm with the inclined surface 251, which protrudes between the bottom surface 212 and the supporting surface 213. The first stopper 25 is an elastic structure with an opening 252, whose inclined surface 251 withholds the top case 3 and maintains the top case 3 at the first opened position as described in the previous embodiments. As the top case 3 is at the second opened position, the first stopper 25 will be compressed by the top case 3 and deformed to retract.

Figure 17:
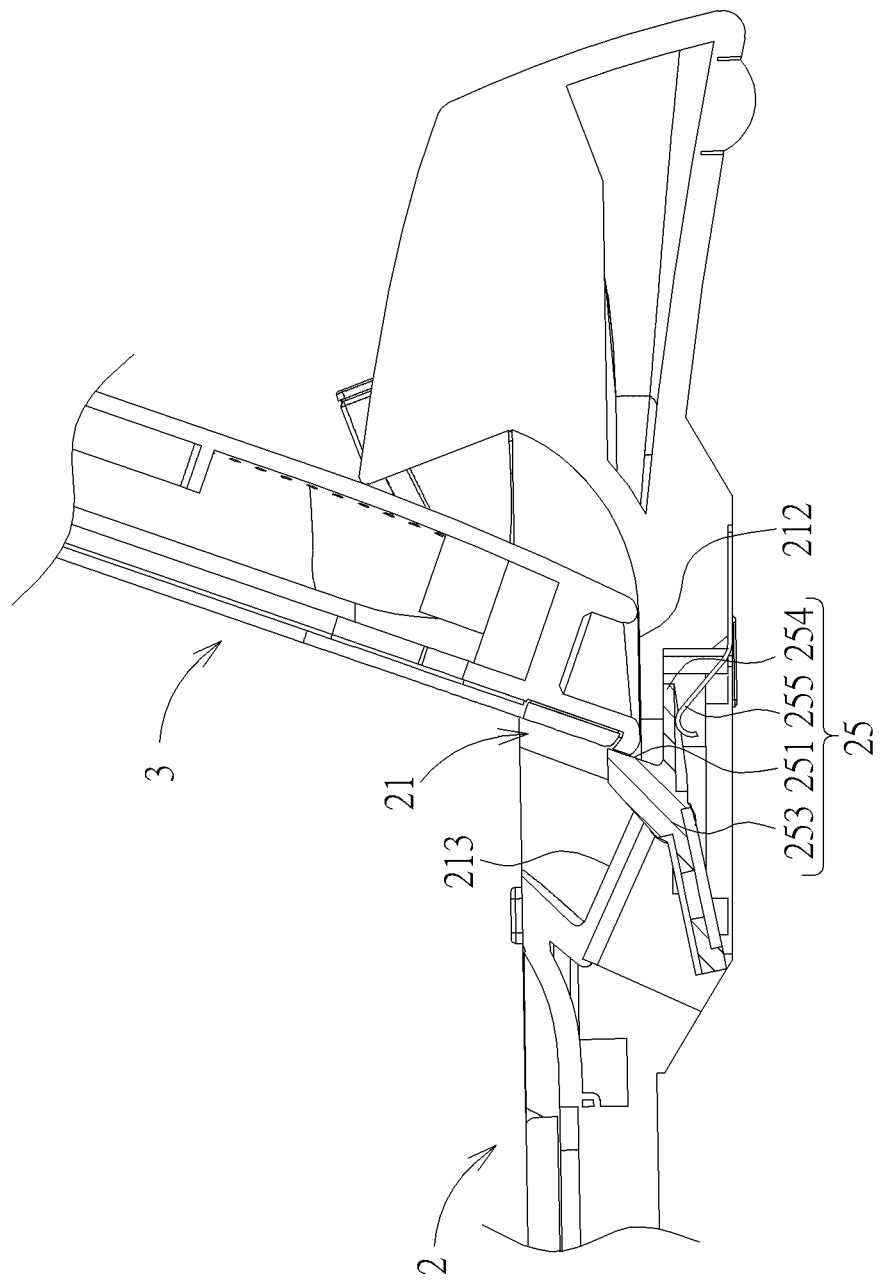
FIG. 17 is a schematic diagram showing a partial side cross sectional view of the top case disposed at the first opened position with respect to a fifth embodiment of the bottom case.
Figure 18:
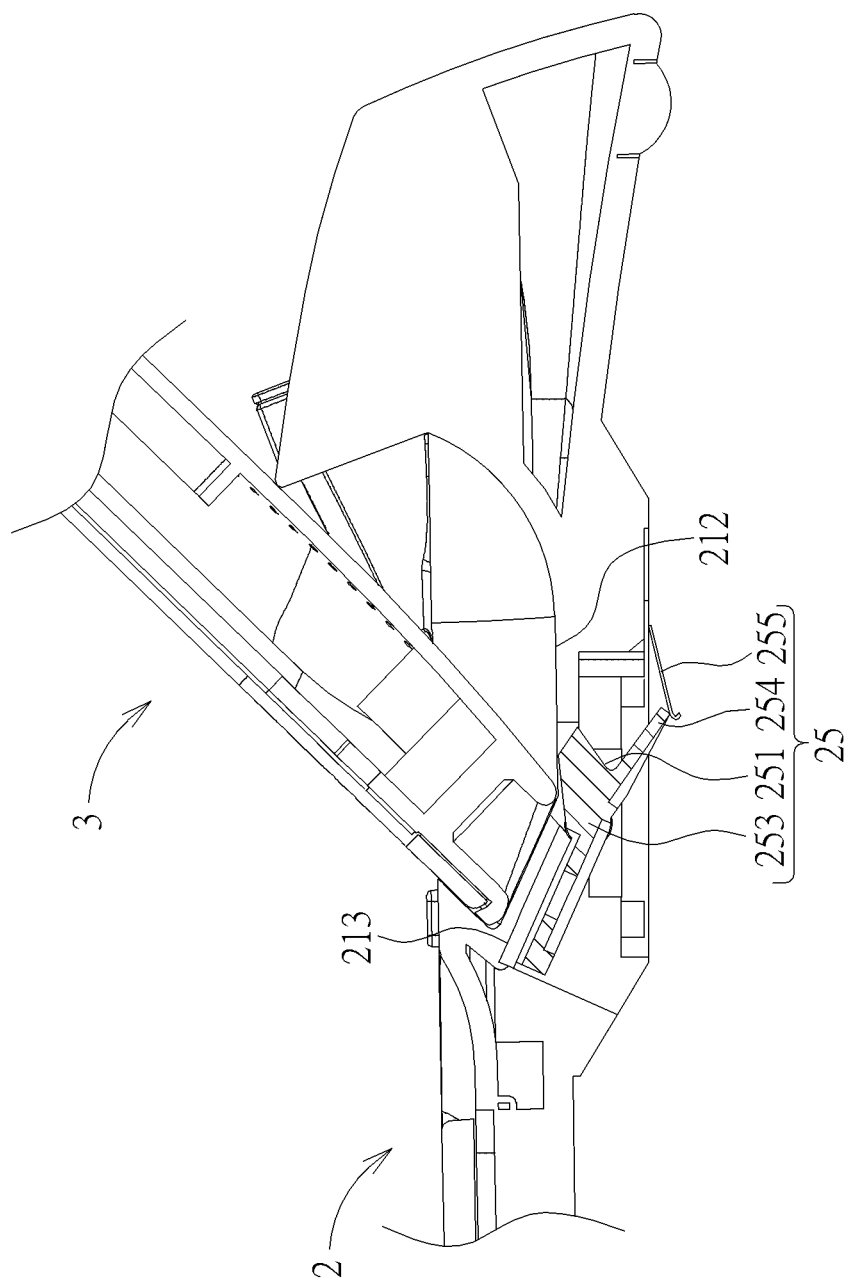
FIG. 18 is a schematic diagram showing a partial side cross sectional view of the top case disposed at the second opened position with respect to the fifth embodiment of the bottom case.

Please refer to FIG. 17 and FIG. 18. FIG. 17 is a schematic diagram showing a partial side cross sectional view of the top case disposed at the first opened position with respect to a fifth embodiment of the bottom case and FIG. 18 is a schematic diagram showing a partial side cross sectional view of the top case disposed at the second opened position with respect to the fifth embodiment of the bottom case. For the fifth embodiment, the first stopper 25 includes a rotating piece 253 and an elastic piece 255. The inclined surface 251 is located at the rotating piece 253 and protrudes from between the bottom surface 212 and the supporting surface 213. The rotating piece 253 is pivotally disposed near the bottom surface 212 and has an arm 254 located near the bottom surface 212. The elastic piece 255 is connected between the groove 21 and the arm 254. In FIG. 17, the elastic piece 255 pushes the arm 254 to protrude the inclined surface 251 from between the bottom surface 212 and the supporting surface 213, so as to maintain the top case 3 at the first opened position. In FIG. 18, as the top case 3 is at the second opened position, the top case 3 presses down the rotating piece 253 to sink between the bottom surface 212 and the supporting surface 213.

Figure 19:
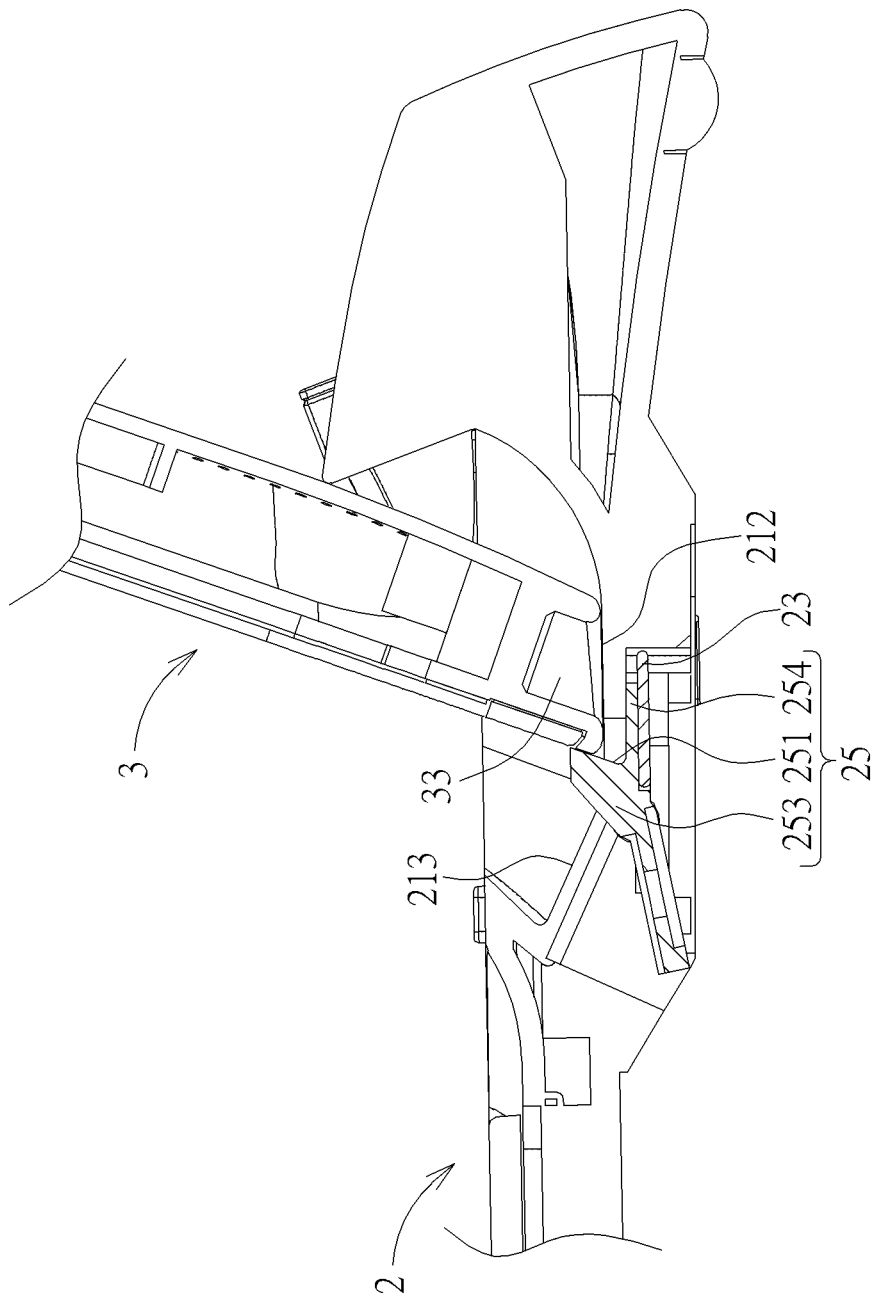
FIG. 19 is a schematic diagram showing a partial side cross sectional view of the top case disposed at the first opened position with respect to a sixth embodiment of the bottom case.
Figure 20:
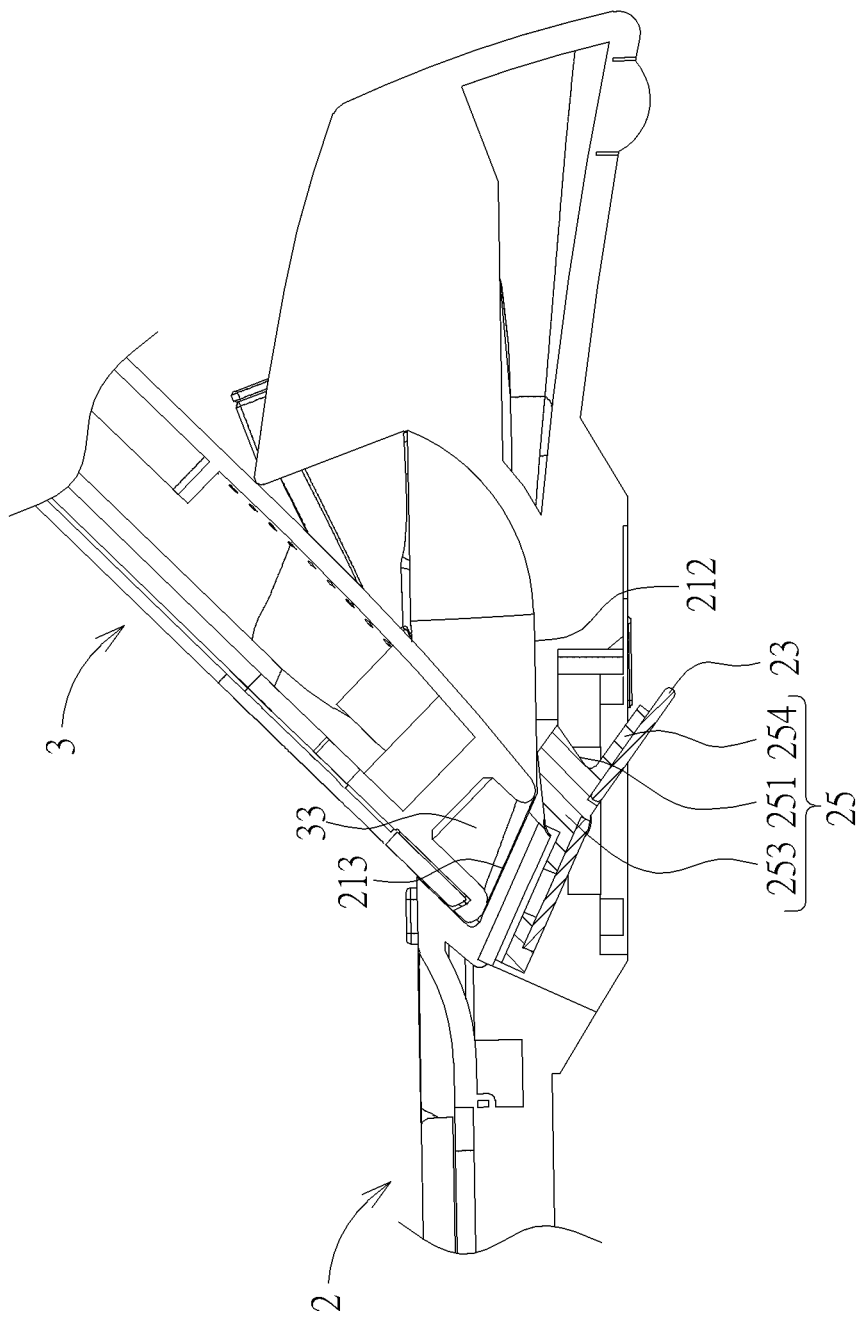
FIG. 20 is a schematic diagram showing a partial side cross sectional view of the top case disposed at the second opened position with respect to the sixth embodiment of the bottom case.

Please refer to FIG. 19 and FIG. 20. FIG. 19 is a schematic diagram showing a partial side cross sectional view of the top case disposed at the first opened position with respect to a sixth embodiment of the bottom case and FIG. 20 is a schematic diagram showing a partial side cross sectional view of the top case disposed at the second opened position with respect to the sixth embodiment of the bottom case. For the sixth embodiment, the first stopper 25 includes a rotating piece 253 and the inclined surface 251 is located at the rotating piece 253 and protrudes from between the bottom surface 212 and the supporting surface 213. The rotating piece 253 is pivotally disposed near the bottom surface 212 and has an arm 254 located near the bottom surface 212. The first magnetic element 23 is disposed at the arm 254. In FIG. 19, as the top case 3 is at the first opened position, the upper magnetic element 33 of the top case 3 and the first magnetic element 23 are in attraction with each other, which causes the first magnetic element 23 at the arm 254 to rotate the rotating piece 253 to protrude the inclined surface 251 from between the bottom surface 212 and the supporting surface 213, so as to maintain the top case 3 at the first opened position. In FIG. 20, as the top case 3 is at the second opened position, the top case 3 presses down the rotating piece 253 to sink between the bottom surface 212 and the supporting surface 213.

Figure 21:
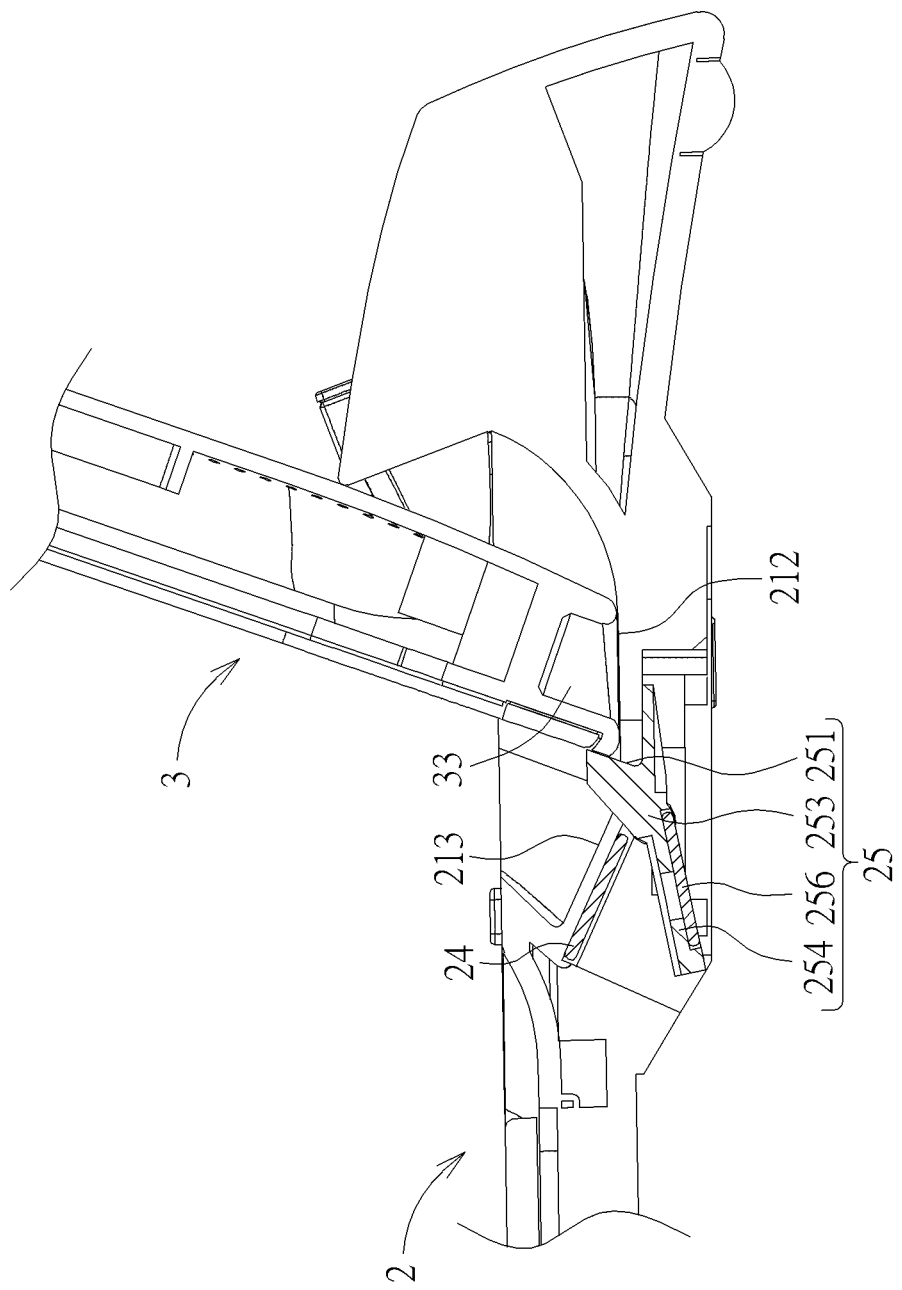
FIG. 21 is a schematic diagram showing a partial side cross sectional view of the top case disposed at the first opened position with respect to a seventh embodiment of the bottom case.
Figure 22:
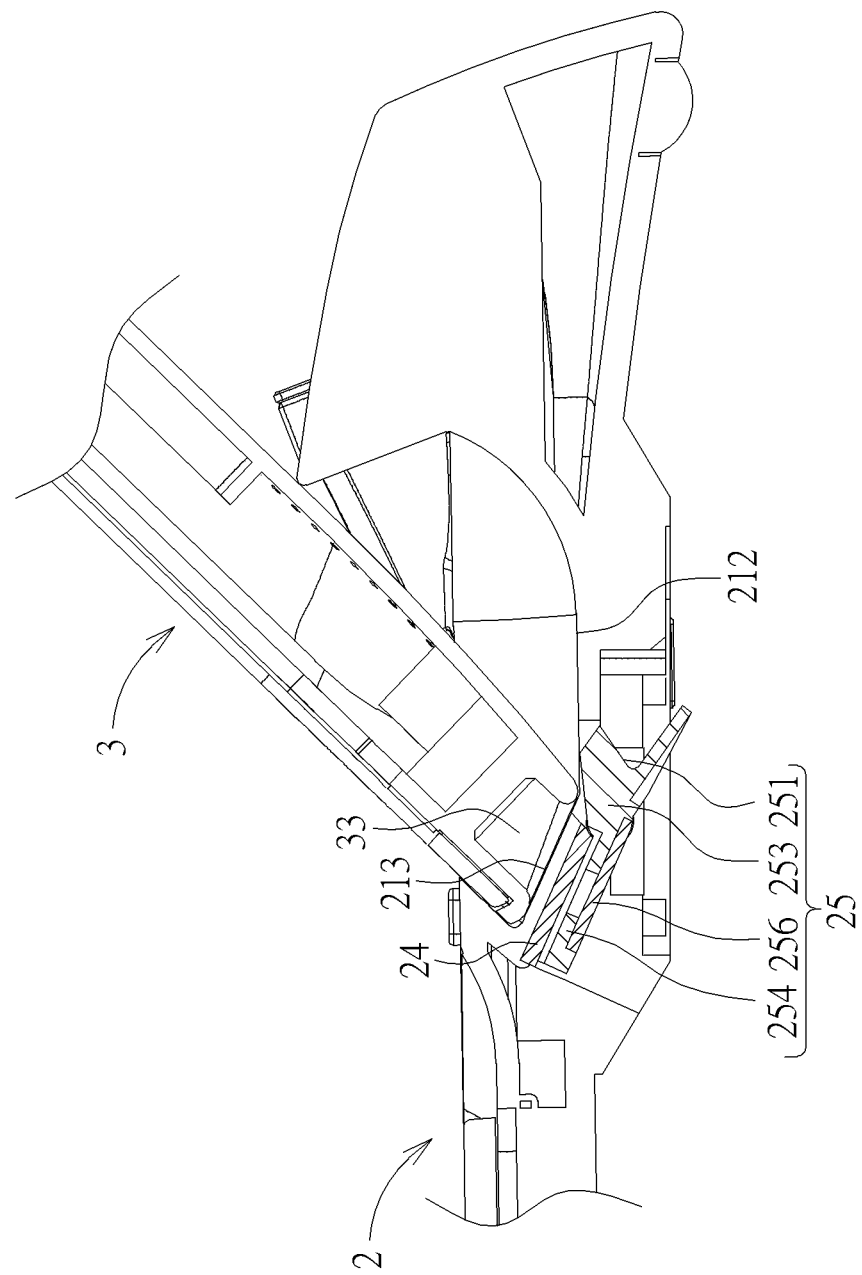
FIG. 22 is a schematic diagram showing a partial side cross sectional view of the top case disposed at the second opened position with respect to the seventh embodiment of the bottom case.

Please refer to FIG. 21 and FIG. 22. FIG. 21 is a schematic diagram showing a partial side cross sectional view of the top case disposed at the first opened position with respect to a seventh embodiment of the bottom case and FIG. 22 is a schematic diagram showing a partial side cross sectional view of the top case disposed at the second opened position with respect to the seventh embodiment of the bottom case. For the seventh embodiment, the first stopper 25 includes a rotating piece 253 and the inclined surface 251 is located at the rotating piece 253 and protrudes from between the bottom surface 212 and the supporting surface 213. The rotating piece 253 is pivotally disposed near the bottom surface 212 and has an arm 254 and an arm magnetic element 256 located near the supporting surface 213. The arm magnetic element 256 is disposed at the arm 254. In FIG. 21, as the top case 3 is at the first opened position, the second magnetic element 24 correspondingly repels the arm magnetic element 256, which causes the arm magnetic element 256 at the arm 254 to rotate the rotating piece 253 to protrude the inclined surface 251 from between the bottom surface 212 and the supporting surface 213, so as to maintain the top case 3 at the first opened position. In FIG. 22, as the top case 3 is at the second opened position, the top case 3 presses down the rotating piece 253 to sink between the bottom surface 212 and the supporting surface 213.

The folding device of the invention provides the top case having magnetic elements at the top magnetic section and provides the bottom case having the groove and multiple magnetic elements around the groove at the bottom magnetic section. As the top magnetic section of the top case is disposed at the bottom magnetic section of the bottom case, the top case is configurable at one of the folded position, at least the first opened position and the second opened position with respect to the bottom case. When the top case is at the first opened position, the first stopper and the first magnetic element at the groove of the bottom magnetic section maintain the top case at the first opened position; when the top case is at the second opened position, the second stopper and the second magnetic element at the groove of the bottom magnetic section maintain the top case at the second opened position.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A folding device, comprising:
    a bottom case having a bottom magnetic section, the bottom magnetic section comprising:
        a groove, comprising a first abutting portion, a bottom surface, and a supporting surface, the bottom surface between the first abutting portion and the supporting surface;
        a lower magnetic element disposed near the first abutting portion;
        a first magnetic element disposed near the bottom surface;
        a first stopper disposed between the bottom surface and the supporting surface; and
        a second stopper disposed at an end of the supporting surface; and
    a top case having a top magnetic section, the top magnetic section comprising a upper magnetic element disposed at a bottom end of the top case, the top case selectively configurable at a folded position, a first opened position, or a second opened position with respect to the bottom case, wherein:
        when the top case is at the folded position, the upper magnetic element and the lower magnetic element are in attraction with each other;
        when the top case is at the first opened position, a second abutting portion of the top case abuts against an end portion of the first abutting portion, the upper magnetic element and the first magnetic element are in attraction with each other, and the bottom end is positioned by the first stopper; and
        when the top case is at the second opened position, the second abutting portion abuts against the end portion of the first abutting portion, and the bottom end is positioned by the second stopper;
    wherein the top case moves from the first opened position to the second opened position via the second abutting portion moving relative to the bottom case.

2. The folding device of claim 1, wherein the bottom magnetic section further comprises a second magnetic element disposed near the supporting surface, and the upper magnetic element and the second magnetic element are in attraction with each other when the top case is at the second opened position.

3. The folding device of claim 2, wherein each of the lower magnetic element, the first magnetic element, the second magnetic element, and the upper magnetic element comprises at least two magnets aligning adjacent to one another with opposite polarity.

4. The folding device of claim 1, wherein the top magnetic section further comprises a third magnetic element disposed near the second abutting portion and the third magnetic element and the lower magnetic element are in attraction with each other when the top case is at the first opened position, the second opened position, or moving between the first opened position and the second opened position.

5. The folding device of claim 4, wherein the top case comprises a chamber near the second abutting portion, the third magnetic element disposed and moveable within the chamber and comprising at least two magnets aligning adjacent to one another with opposite polarity.

6. The folding device of claim 1, wherein an arm of force is defined along the connection of an abutting point where the second abutting portion abuts against the first abutting portion and an attraction center between the upper magnetic element and the first magnetic element, the first stopper comprises an inclined surface, and the included angle between the inclined surface and the arm or force is between 40 to 75 degrees.

7. The folding device of claim 6, wherein the first stopper is a wall connecting the bottom surface and the supporting surface.

8. The folding device of claim 6, wherein the first stopper is a bump disposed between the bottom surface and the supporting surface.

9. The folding device of claim 6, wherein the first stopper is an elastic arm having the inclined surface and protruding between the bottom surface and the supporting surface.

10. The folding device of claim 6, wherein the first stopper comprises a rotating piece pivotally disposed near the bottom surface and the inclined surface protruding from between the bottom surface and the supporting surface.

11. The folding device of claim 10, wherein the rotating piece comprises an arm near the bottom surface, and the first stopper further comprises an elastic piece connecting between the groove and the arm.

12. The folding device of claim 10, wherein the rotating piece comprises an arm near the bottom surface, the first magnetic element disposed at the arm and adaptive to rotate the rotating piece to protrude the inclined surface from between the bottom surface and the supporting surface when the top case is at the first opened position where the upper magnetic element and the first magnetic element are in attraction with each other.

13. The folding device of claim 10, wherein the bottom magnetic section further comprises a second magnetic element disposed near the supporting surface and the rotating piece comprises an arm and an arm magnetic element near the supporting surface, the arm magnetic element disposed at the arm and adaptive to rotate the rotating piece to protrude the inclined surface from between the bottom surface and the supporting surface when the top case is at the first opened position where the second magnetic element and correspondingly repels the arm magnetic element.

14. The folding device of claim 1, wherein when the top case is at the first opened position, the top case and the bottom case have included angle of 110 degrees, and when the top case is at the second opened position, the top case and the bottom case have included angle of 135 degrees.

15. The folding device of claim 1, wherein the top case is a tablet device and the bottom case is a keyboard.

16. A bottom case, for being assembled with a top case where the top case is selectively configurable at a folded position, a first opened position, or a second opened position with respect to the bottom case, the bottom case comprising:
- a groove, comprising a first abutting portion, a bottom surface, and a supporting surface, the bottom surface between the first abutting portion and the supporting surface;
- a lower magnetic element disposed near the first abutting portion;
- a first magnetic element disposed near the bottom surface;
- a first stopper disposed between the bottom surface and the supporting surface; and
- a second stopper disposed at an end of the supporting surface.

17. The bottom case of claim 16, wherein the first stopper is a wall connecting the bottom surface and the supporting surface.

18. The bottom case of claim 16, wherein the first stopper is a bump disposed between the bottom surface and the supporting surface.

19. The bottom case of claim 16, wherein the first stopper is an elastic arm having an inclined surface and protruding between the bottom surface and the supporting surface.

20. The bottom case of claim 16, wherein the first stopper comprises a rotating piece pivotally disposed near the bottom surface and an inclined surface protruding from between the bottom surface and the supporting surface.

* * * * *